United States Patent
Roth

(10) Patent No.: US 6,727,290 B2
(45) Date of Patent: Apr. 27, 2004

(54) PROCESS OF MAKING RIGID POLYURETHANE FOAM

(75) Inventor: Arthur J. Roth, Orinda, CA (US)

(73) Assignee: Hunter Paine Enterprises, LLC, Lafayette, CA (US)

( * ) Notice: Subject to any disclaimer, the term of this patent is extended or adjusted under 35 U.S.C. 154(b) by 111 days.

(21) Appl. No.: 10/102,894

(22) Filed: Mar. 22, 2002

(65) Prior Publication Data

US 2003/0181536 A1 Sep. 25, 2003

Related U.S. Application Data

(63) Continuation-in-part of application No. 10/093,407, filed on Mar. 11, 2002, now Pat. No. 6,605,650.
(51) Int. Cl.$^7$ .............................................. C08G 18/10
(52) U.S. Cl. ........................ 521/54; 521/137; 521/155; 521/170; 521/174
(58) Field of Search ........................ 521/54, 170, 155, 521/137, 174

(56) References Cited

U.S. PATENT DOCUMENTS

| | | |
|---|---|---|
| 5,833,796 A | 11/1998 | Matich |
| 6,022,912 A * | 2/2000 | Spitler et al. .............. 264/45.1 |

* cited by examiner

Primary Examiner—John M. Cooney, Jr.
(74) Attorney, Agent, or Firm—Fitzpatrick, Cella, Harper & Scinto

(57) ABSTRACT

In a process of generating a polyurethane foam by forming a mixture including isocyanate and polyol reactants, catalyst, and blowing agent, which mixture reacts exothermically to yield a rigid polyurethane foam, there is included in the mixture expandable polymer beads, made of a thermoplastic polymer (e.g., polystyrene or a polyolefin) that has a softening point at or below the maximum temperature reached during the exothermic reaction. The beads may be added in unexpanded form, partially expanded form, or fully expanded form. The heat of the urethane-forming reaction causes the beads to sinter, creating hollow polymeric spheres in the foam, which are larger than the cells in the polyurethane matrix, and which appear to improve the foam's crush resistance.

7 Claims, No Drawings

PROCESS OF MAKING RIGID POLYURETHANE FOAM

This application is a continuation-in-part of my U.S. patent application Ser. No. 10/093,407, entitled "Process of Making Lightweight, Rigid Polyurethane Foam," which was filed Mar. 11, 2002 now U.S. Pat. No. 6,605,650.

This invention concerns a method of making a rigid polyurethane foam that is cost efficient and which yields a product that is relatively light in weight, yet has good crush resistance.

Polyurethane resins are made by reacting polyols with polyisocyanates. The reaction is exothermic. Cross-linking, or branching, of the polyurethane molecules can be achieved by including in the reaction mixture some polyol molecules and/or isocyanate molecules that have at least three functional groups, and by adjusting the ratio of reactants accordingly. With sufficient cross-linking, rigid, thermoset polymers are obtained.

To make rigid polyurethane foam, a mixture is made of a polyfunctional isocyanate, a polyol, a blowing agent, a catalyst, and, usually, a cell-size regulator (e.g., a surfactant). A urethane-forming reaction begins once the ingredients are combined, an exotherm forms, and the blowing agent or agents cause closed cells to form in the polymer as the mass expands and solidifies. The exotherm typically reaches a peak temperature of at least about 150° F. The isocyanate and polyol reactants include enough molecules with three or more functional groups that the degree of cross-linking or branching is sufficient to produce a rigid foam.

Aromatic polyisocyanates often are used when making rigid foam. Some examples are toluene diisocyanate (TDI) and polymeric isocyanate (PMDI), which is obtained by the condensation of aniline with formaldehyde.

Polyols that can be used include polyether polyols and polyester polyols. Propylene oxide adducts of polyfunctional hydroxy compounds or amines are one type of polyether polyols that can be used. Mixtures of polyester polyols and polyether polyols sometimes are employed.

Halogenated hydrocarbons, such as hydrochlorofluorocarbons and hydrofluorocarbons, can be used as blowing agents. Lower alkanes such as pentanes and cyclopentanes can be used as well. Water can also be used, as it will react with isocyanate to generate carbon dioxide in situ. Sometimes water or carbodiimide catalysts are used to generate carbon dioxide as a co-blowing agent. Often the blowing agent or agents are preblended with the polyol, together with the catalyst and the cell-size regulator, which usually is a surfactant.

All of this is well known to persons of ordinary skill in the art and is described, for example, in Kirk-Othmer Encyclopedia of Chemical Technology, 4$^{th}$ Ed. (1997), vol. 24, pp. 695–715, which is incorporated herein by reference.

The cost of the reactants to make rigid polyurethane foam is relatively expensive. It has now been discovered that the cost per volume unit of the finished foam can be lowered by including in the polyurethane reaction mixture expandable polystyrene beads (EPS) that are made of a polystyrene that has a softening point that is equal to or below the maximum temperature reached by the exotherm during the urethane-forming reaction. The heat of the urethane-forming reaction causes the polystyrene beads to sinter, while trapped in the foaming matrix of polyurethane, creating pockets that are generally larger than the cells of the polyurethane. Since the polystyrene beads are less expensive, on a volume basis, than the foamed polyurethane, the materials cost of the polystyrene-containing foam is less than that of the same volume of straight polyurethane foam. The monetary savings can be substantial, as the cost ratio of polyurethane foam to fully expanded polystyrene, on a volumetric basis, is currently about 25/1 to 30/1.

A side benefit of including the polystyrene beads as a filler in the polyurethane is that the resultant foam is less dense than unfilled polyurethane. Yet another benefit is that the polystyrene-containing foam, despite the presence of the relatively low-cost filler (the expanded polystyrene), appears to have the same or better crush resistance as the unfilled polyurethane.

Expandable polystyrene beads are cellular pellets of expandable polystyrene that often are used to form lightweight molded objects. Created in a more or less granular form, and with an expanding agent in the cells, typically the beads are pre-foamed, or "pre-expanded," by heating to a temperature above their softening point, which often will be in the range of about 165–185° F., until they foam to give a loose aggregate of the desired bulk density. The pre-foamed particles, which retain their cellular structure, may then be placed in a mold or other cavity and heated with live steam, causing them to sinter and fuse together to form a lightweight, cellular solid whose dimensions correspond to those of the mold cavity. When fully expanded, the beads often will have a diameter that is about 2 to 4 times that of the unexpanded, or "raw," beads.

When present in the reaction mixture that forms a rigid polyurethane foam, the EPS beads, as mentioned above, sinter. In addition, however, at least a substantial portion of the beads lose their cellular structure, creating gas-filled pockets, of various sizes, in the foam, which are lined with the polystyrene of which the cellular structure was formed. It appears that isolated spherical beads generate relatively spherical pockets. In some sense, it might be said that there are thin-walled polystyrene globules dispersed throughout the polyurethane foam, as a result of the inclusion of the EPS beads in the reaction mixture.

Moreover, it appears that these polystyrene globules are coated with a layer of "skinned" polyurethane, i.e., a thin continuous layer of the polyurethane, much as is present on the outer surface of rigid polyurethane foam moldings. The presence of these double-walled hollow structures seems to enhance the foam's crush resistance.

Methods of making expandable polystyrene beads are well known. As disclosed in U.S. Pat. Nos. 3,991,020; 4,287,258; 4,369,227; 5,110,835; 5,115,066; and 5,985,943, for example, all of which are incorporated herein by reference, EPS beads may be made by polymerizing styrene in an aqueous suspension, in the presence of one or more expanding agents that are fed at the beginning, during, or at the end of polymerization. Alternatively, they may be made by adding an expanding agent to an aqueous suspension of finely subdivided particles of polystyrene.

The expanding agent, also called a "blowing agent," is a gas or liquid that does not dissolve the styrene polymer and which boils below the softening point of the polymer. Examples of suitable blowing agents include lower alkanes and halogenated lower alkanes, e.g., propane, butane, pentane, cyclopentane, hexane, cyclohexane, dichlorodifluoromethane, and trifluorochloromethane. Often the beads contain about 3 to 15%, based on the weight of the polymer, of the blowing agent. Preferably, the blowing agent will be present at a level of about 3 to 7%.

By "beads" we here mean small particles of any geometry, e.g., spherical, cylindrical, or lumpy. By "polystyrene" is here meant a styrene homopolymer or copolymer containing 50 wt. % or more, preferably at least 80 wt. %, of styrene. Examples of suitable comonomers are α-methylstyrene, ring-halogenated styrenes, ring-alkylated styrenes, acrylonitrile, esters of acrylic or methacrylic acid with alcohols having from 1 to 8 carbon atoms, N-vinylcarbazole, and maleic acid or anhydride. A minor amount of a copolymerized chain-branching agent may be included in the polymer as well. Suitable such agents are compounds containing at least two α,β-ethylenically unsaturated groups, such as divinyl benzene, butadiene, and butanediol diacrylate. Branching agents are generally used in an amount of about 0.005 to 0.05 mol %, based on the styrene.

The polystyrene in the EPS beads usually has a weight average molecular weight in the range of about 130,000 to about 300,000.

Expandable polystyrene beads may contain other additives to impart specific properties either to the beads or to the expanded products. These include, for example, flameproofing agents, fireproofing agents, nucleating agents, decomposable organic dyes, lubricants, fillers, and anti-agglomerating additives. As disclosed in U.S. Pat. No. 6,271,272, incorporated herein by reference, the beads may also include additives, e.g., certain petroleum waxes, that quicken the rate of expansion when the beads are heated to expansion temperature. Depending on the intended effect, the additives may be homogeneously dispersed in the beads or present as a surface coating.

EPS beads come in different unexpanded particle sizes. Generally, a bead's longest dimension (e.g., its diameter), on a weight average basis, will be in the range of about 0.1 to 6 mm, often about 0.4 to 3 mm. It is thought that unexpanded particle sizes in the range of about 0.4 to 1.6 mm are preferred for the beads used in the present invention.

Unexpanded EPS beads vary as to their expansion capability, i.e., how large they can get when heated to expansion temperature. In part, this is a function of how much blowing agent they contain. The expansion capability of an EPS bead can be reported in terms of the bulk density of the loose aggregate the beads will form when they are fully expanded ("fully expanded density"). By "fully expanded" is here meant the expansion that results from the "two pass" expansion process described in Example 2 of U.S. Pat. No. 5,115,066. This entails the use of a Tri Manufacturing Model 502 expander (or equivalent), operated at an inlet steam temperature of about 211° F. and an inlet steam flow rate of approximately 74 pounds per hour. The first-pass throughput rate is about 208 pounds per hour. A fluidized bed drier, blowing ambient air, is used to cool the resulting prepuff. After aging for 3 hours at ambient temperature and humidity, the prepuff is run through the expander again, under the same conditions, except operating at a throughput rate of about 217 pounds per hour.

It is thought that the use of EPS beads having a capability of reaching a fully expanded density in the range of about 0.5 to 4.5 pounds per cubic foot (pcf), e.g., about 1 to 3 pcf, is preferred in the present invention. Examples of some commercial EPS beads that can be used in the present invention are Types 3371, 5371, and 7371 from Huntsman Chemical and Types BFL 322, BFL 422, BF 322, BF 422, and P 240 from BASF Corporation.

The EPS beads can be unexpanded, partially expanded, or fully expanded before being mixed with the polyurethane-forming reactants. If they are unexpanded or only partially expanded, the exotherm from the polyurethane-forming reaction will cause them to expand as well as sinter, while the polyurethane resin forms, foams, and sets.

The polystyrene beads may be added to one of the polyurethane reaction mixture components prior to mixing the components, or the beads may be added just after the components are mixed, e.g., while the exothermic reaction is taking place. It is believed that the apparatuses and processes disclosed in U.S. Pat. Nos. 5,152,943 and 5,547,276, each of which is incorporated herein by reference, are effective for adding expandable polystyrene beads to a component. It is believed that the process disclosed in U.S. Pat. No. 6,065,862, which is incorporated herein by reference, is effective for adding expandable polystyrene beads to the mixture. Of course, one of ordinary skill will appreciate that other apparatuses and processes may be used.

The amount of expandable polystyrene beads added to the polyurethane reaction mixture in the present process preferably is enough to lower the density of the resultant foam, but not so much as to prevent the polyurethane from being the continuous phase in the finished foam. By "lower the density" is meant that had the same polyol and isocyanate reactants been used, in the same amounts, but without any of the EPS beads, the density of the resultant polyurethane foam would have been greater than what resulted when the EPS beads were present. In one free rise experiment, for example, by adding 4 wt. % of fully expanded EPS beads, the density of the rigid polyurethane foam was lowered from 5.5 pcf to 4.95 pcf.

It is believed to be generally preferred that the amount of the expandable polystyrene beads be about 5% or less, e.g., about 1 to 4%, based on the combined weight of the polyurethane reactants. Amounts greater than 4 or 5 wt. % may be difficult to uniformly mix into the polyurethane reactants, especially if the beads are pre-expanded to, say, at least 50 or 75% of their full expansion capability. (By expansion to "50% of full expansion capability" is meant, herein, expansion to a bulk density that is one-half the beads' fully expanded density.)

The reaction and foaming of the EPS-containing reaction mixture can take place in an unrestricted space or in an enclosure, such as a mold, that will confine the mixture of foaming and expanding ingredients. When the reaction and foaming occurs in a confined enclosure, it is contemplated that the volumetric ratio of void space to reactants in the enclosure will be such as to generate during the foaming process a maximum pressure of at least about 20 or 30 psi, and ranging up to about 70 psi.

The term "polyurethane system" can be used to refer to a particular combination of isocyanate, polyol, catalyst, blowing agent, and cell size regulator. A characteristic that helps identify and distinguish polyurethane systems is the density of the foam a particular system will create when the components are mixed in an open vessel (the "free rise density"). It is thought that polyurethane systems having a free rise density of about 3 or 4 pcf to 20 or 25 pcf are generally preferred for use in the present invention.

Examples of some commercial isocyanate/polyol pairings that can be employed in forming polyurethane systems for use in the present invention are the following:

| Isocyanate Component | Polyol Component | Rated Free Rise Density (pcf) |
| --- | --- | --- |
| Rubinate M | Rimline WL 87380 | 8–9 |
| Rubinate M | Rimline WL 87381 | 15–18 |
| Baydur 645 B | Baydur 645 A | 5 |
| Baydur 730 B (U 731 B) | Baydur 649 A | 9 |

In the above table, the Rubinate and Rimline reactants are available from Huntsman Chemicals, and the Baydur reactants are available from Bayer Corporation.

It is thought to be generally preferred, when practicing the process of the present invention, that polyurethane reactants be used that will generate an exotherm having a peak temperature in the range of about 185–285° F.

The invention perhaps will be better understood by considering the following examples of how it can be practiced.

EXAMPLE 1

A homogeneous mixture is formed in an open vessel of 100 parts (by weight) of Rimline WL 87380 polyol, obtained from Huntsman Chemicals; 160 parts of Rubinate M isocyanate, also obtained from Huntsman; and 10 parts of Huntsman Type 5371 expandable polystyrene beads that have been substantially fully expanded. The polyol and isocyanate components are combined first, then the EPS beads are added.

Rimline WL 87380 is a polyether polyol formulation containing some water. Rubinate M is an aromatic polyisocyanate. The system generates $CO_2$ in situ as a blowing agent, through the reaction of the isocyanate with the water.

Huntsman Type 5371 EPS beads have unexpanded particle sizes that generally fall in the range of 1.1 to 1.6 mm. The beads contain n-pentane as the blowing agent, and they have a fully expanded density in the range of about 1.5–3 pcf.

Once all the ingredients are mixed, the isocyanate and polyol begin to react, the exotherm builds, and a rigid, free-rise foam is obtained. The heat of the urethane-forming reaction causes the EPS beads to sinter. Many, if not most, of the beads create generally spherical bubbles in the foam, ranging widely in size. Most of the bubbles have diameters in the range of about 2 to 4 mm.

If one cuts cleanly through the foam, the cross section resembles a lunar surface, in that it is fall of craters of various sizes, created by the cleaving in two of the many polystyrene bubbles lying in the plane of the cut. As mentioned above, the bubbles appear to be lined with polystyrene, and these polystyrene shells appear to be covered with polyurethane skin that is integral with the matrix of polyurethane foam.

The foam has a lower density than the rated free rise density of the polyurethane system used, yet the foam has excellent crush resistance.

EXAMPLE 2

The procedure of Example 1 is repeated, except that Rimline WL 87381 is used as the polyol component. Once again, a rigid foam is obtained that is lower in density than the rated free rise density of the polyurethane system used, but which has excellent crush resistance.

It is contemplated that the present process can be performed using any expandable polymer beads that are made of a thermoplastic polymer that has a softening point at or below the maximum temperature reached during the exothermic reaction. Thus, besides expandable polystyrene beads, it is contemplated that the process can be performed using expandable polyolefin (EPO) beads. Again, the urethane reaction mixture should be one that produces an exotherm with a temperature at least as high as the softening point of the thermoplastic polymer of which the beads are made.

As examples of expandable polyolefin beads may be mentioned expandable polyethylene (EPE), expandable polypropylene (EPP), expandable polybutylene (EPB), and copolymers of ethylene, propylene, butylene, 1,3-butadiene, and other olefin monomers, particularly alpha-olefin monomers having from 5 to 18 carbon atoms, and/or cycloalkylene monomers such as cyclohexene, cyclopentene, cyclohexadiene, and norbornene. Propylene/ethylene copolymers and propylene/butylene copolymers may be preferred.

Methods of making expandable polyolefin beads are disclosed, for example, in U.S. Pat. Nos. 6,020,388; 5,496,864; 5,468,781; 5,459,169; 5,071,883; 4,769,393; and 4,675,939, all of which are incorporated herein by reference.

Again, it is contemplated that the expandable polymer beads may be incorporated into the urethane reaction mixture either in unexpanded form, partially expanded form, or substantially fully expanded form. If used in partially expanded form, they may, for example, be pre-expanded to about 50% or more of their full expansion capability, e.g., about 75% or more of full expansion size, measured as bulk density.

I claim:

1. In a process of generating a polyurethane foam by forming a mixture comprising isocyanate and polyol reactants, catalyst, and blowing agent, which mixture reacts exothermically to yield a rigid polyurethane foam, the IMPROVEMENT wherein there is included in the mixture unexpanded or partially expanded expandable polymer beads made of a thermoplastic polymer that has a softening point at or below the maximum temperature reached during the exothermic reaction, whereby the heat of the polyurethane-forming reaction causes the beads to expand and sinter, while trapped in a foaming matrix of polyurethane, creating gas-filled pockets in the foam that are lined with the polymer of which the beads are formed.

2. The process of claim 1, wherein the beads are expandable polystyrene or polyolefin beads.

3. The process of claim 1, wherein the beads are expandable polystyrene beads.

4. The process of claim 1, wherein the beads' longest dimension when unexpanded, on a weight average basis, is within the range of about 0.4 to 3 mm.

5. The process of claim 1, wherein the isocyanate and polyol reactants are combined before the polymer beads are added to either of those ingredients.

6. The process of claim 3, wherein the beads' longest dimension when unexpanded, on a weight average basis, is within the range of about 0.4 to 3 mm.

7. The process of claim 6, wherein the isocyanate and polyol reactants are combined before the polymer beads are added to either of those ingredients.

* * * * *